US010673470B2

(12) United States Patent
Lee et al.

(10) Patent No.: US 10,673,470 B2
(45) Date of Patent: Jun. 2, 2020

(54) WIRELESS COMMUNICATION CIRCUIT FOR SUPPORTING MULTIPLE FREQUENCY BANDS AND APPARATUS HAVING THE SAME

(71) Applicant: SAMSUNG ELECTRONICS CO., LTD., Suwon-si, Gyeonggi-do (KR)

(72) Inventors: Han Yeop Lee, Suwon-si (KR); Dong Il Yang, Suwon-si (KR); Jong Hun Yoo, Suwon-si (KR); Hyo Seok Na, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/010,815

(22) Filed: Jun. 18, 2018

(65) Prior Publication Data

US 2018/0367168 A1 Dec. 20, 2018

(30) Foreign Application Priority Data

Jun. 19, 2017 (KR) .......................... 10-2017-0077403

(51) Int. Cl.
 *H04B 1/40* (2015.01)
 *H04B 1/00* (2006.01)

(52) U.S. Cl.
 CPC ........... *H04B 1/005* (2013.01); *H04B 1/0057* (2013.01); *H04B 1/40* (2013.01)

(58) Field of Classification Search
 CPC ...... H04B 1/005; H04B 1/0057; H04B 1/006; H04B 1/40; H04B 1/44
 See application file for complete search history.

(56) References Cited

U.S. PATENT DOCUMENTS

| 8,428,646 B2 * | 4/2013 | Rofougaran ......... H03G 1/0029 370/338 |
| 8,660,043 B2 | 2/2014 | Kim, II et al. |
| 2007/0042802 A1 * | 2/2007 | Park ....................... H04B 1/006 455/552.1 |
| 2011/0085476 A1 | 4/2011 | Kim et al. |
| 2012/0112853 A1 | 5/2012 | Hikino et al. |

(Continued)

FOREIGN PATENT DOCUMENTS

| JP | 2012-100180 | 5/2012 |
| KR | 10-2011-0040299 | 4/2011 |

*Primary Examiner* — Tuan Pham
(74) *Attorney, Agent, or Firm* — Nixon & Vanderhye P.C.

(57) ABSTRACT

An electronic device includes at least one processor, at least one antenna, and a wireless communication circuit electrically connected to the at least one processor and the at least one antenna. The wireless communication circuit includes a switch including a first terminal electrically connected to a path corresponding to a first frequency band, a second terminal electrically connected to a path corresponding to a second frequency band, and a third terminal selectively connected to a corresponding terminal of the first terminal and the second terminal and a filter circuit electrically connected between the third terminal and the at least one antenna and having a designated resonant frequency band. The wireless communication circuit selectively transmits a signal in one corresponding frequency band between the first frequency band and the second frequency band based on a terminal which is connected to the third terminal.

16 Claims, 9 Drawing Sheets

(56) References Cited

U.S. PATENT DOCUMENTS

| | | | |
|---|---|---|---|
| 2014/0227982 A1* | 8/2014 | Granger-Jones | H04B 7/0404 455/77 |
| 2014/0355497 A1* | 12/2014 | Reiha | G01S 19/13 370/281 |
| 2016/0294350 A1 | 10/2016 | Desclos | |
| 2017/0373730 A1* | 12/2017 | Pehlke | H04B 7/0404 |

* cited by examiner

WIRELESS COMMUNICATION CIRCUIT FOR SUPPORTING MULTIPLE FREQUENCY BANDS AND APPARATUS HAVING THE SAME

CROSS-REFERENCE TO RELATED APPLICATION

This application is based on and claims priority under 35 U.S.C. § 119 to Korean Patent Application No. 10-2017-0077403, filed on Jun. 19, 2017, in the Korean Intellectual Property Office, the disclosure of which is incorporated by reference herein in its entirety.

BACKGROUND

1. Field

The present disclosure relates to a wireless communication circuit for supporting multiple frequency bands and a technology for controlling the wireless communication circuit.

2. Description of Related Art

An electronic device, such as a terminal, performing a wireless communication includes a radio frequency (RF) circuit provided with a duplexer to separate signals received or transmitted through an antenna from each other. The duplexer provides a function of filtering signals in addition to a function of separating the signals.

The duplexer processes a signal corresponding to a designated frequency band. When the electronic device supports multiple frequency bands, the electronic device uses a plurality of duplexers respectively corresponding to the frequency bands. As an example, when the electronic device transmits and receives a signal having three frequency bands, the electronic device includes at least three duplexers.

Since components of the electronic device are complex and the electronic device is miniaturized, a space for mounting the components in the electronic device is limited. According to the related art, the electronic device requires plural duplexers with respect to each frequency band, and thus the duplexers occupy a lot of mounting space of the electronic device. In addition, as the number of the frequency bands supported by the electronic device increases, a material cost increases with the addition of the duplexer.

SUMMARY

Various embodiments of the present disclosure provide an electronic device for supporting multiple frequency bands using a tunable duplexer and a method thereof.

In accordance with an aspect of the present disclosure, an electronic device includes at least one processor, at least one antenna, and a wireless communication circuit electrically connected to the at least one processor and the at least one antenna. The wireless communication circuit includes a switch including a first terminal (or port) electrically connected to a path corresponding to a first frequency band, a second terminal electrically connected to a path corresponding to a second frequency band, and a third terminal selectively connected to a corresponding terminal of the first terminal and the second terminal and a filter circuit electrically connected between the third terminal and the at least one antenna and having a designated resonant frequency band. The wireless communication circuit is configured to selectively transmit a signal in one corresponding frequency band between the first frequency band and the second frequency band based on a terminal which is connected to the third terminal.

In accordance with an aspect of the present disclosure, an electronic device includes at least one antenna, a first amplifier corresponding to a first frequency band, a second amplifier corresponding to a second frequency band, a switch including a first terminal electrically connected to the first amplifier, a second terminal electrically connected to the second amplifier, and a third terminal selectively connected to the first terminal or the second terminal, a filter circuit electrically connected between the third terminal and the at least one antenna and having a designated resonant frequency band, a tunable circuit electrically connected to the filter circuit and configured to tune the designated resonant frequency band of the filter circuit to the first frequency band or the second frequency band, and a processor. The processor is configured to electrically connect the first terminal to the third terminal of the switch when a signal is output using the first amplifier, to electrically connect the second terminal to the third terminal of the switch when the signal is output using the second amplifier, and to tune the designated resonant frequency band to a corresponding frequency band of the first frequency band and the second frequency band using the tunable circuit based on a terminal which is connected to the third terminal.

In accordance with an aspect of the present disclosure, a duplexer includes a switch including a plurality of terminals connected to a plurality of paths corresponding to multiple frequency bands and one terminal selectively connected to one of the plurality of terminals, a transmission filter circuit having a designated first resonant frequency band and configured to filter a signal output from the one terminal, and a reception filter circuit having a designated second resonant frequency band and configured to filter a signal received from at least one antenna.

According to various embodiments disclosed in the present disclosure, the electronic device may reduce the cost using the duplexer that supports the multiple frequency bands and may secure the mounting space.

According to various embodiments disclosed in the present disclosure, the electronic device may improve performance of a radio frequency (RF) circuit using the duplexer that supports the multiple frequency bands.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, various example embodiments of the present disclosure will be described with reference to accompanying drawings. Accordingly, those of ordinary skill in the art will recognize that various modifications, equivalents, and/or alternatives of the various embodiments described herein can be made without departing from the scope and spirit of the present disclosure.

Figure 1:
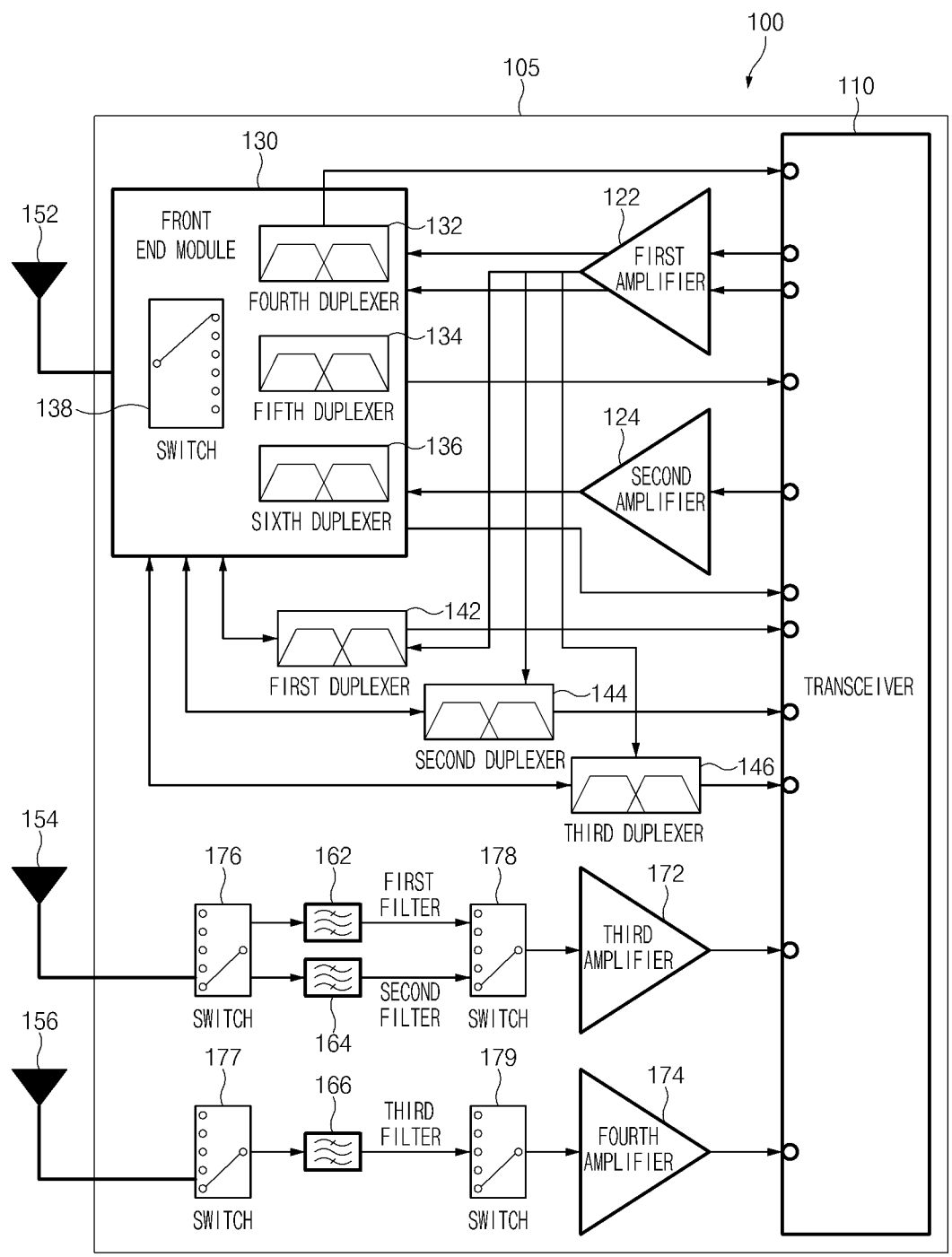
FIG. 1 is a block diagram illustrating an electronic device including a plurality of duplexers according to various embodiments.

FIG. 1 is a block diagram illustrating an electronic device 100 including a plurality of duplexers according to various embodiments.

Referring to FIG. 1, the electronic device 100 may include antennas 152, 154 and 156 and a wireless communication circuit 105. According to various embodiments disclosed in the present disclosure, a configuration of the electronic device 100 may be variously changed. As an example, FIG. 1 shows one antenna, e.g., the antenna 152, used to transmit a signal, but the electronic device 100 may include two or more antennas used to transmit and receive the signal.

According to an embodiment, the wireless communication circuit 105 may include components to process a signal output through at least one antenna (e.g., the antenna 152) and a signal received through at least one antenna (e.g., the antennas 152, 154 and 156). The wireless communication circuit 105 may include a transceiver (e.g., including transceiver circuitry) 110, amplifiers (e.g., amplifiers 122, 124, 172 and 174), duplexers 142, 144 and 146, a front end module (comprising various circuitry) 130, filters 162, 164 and 166, and switches 138 and 176, 177, 178 and 179. According to various embodiments disclosed in the present disclosure, the wireless communication circuit 105 may include additional components or at least some components included in the wireless communication circuit 105 may be omitted. As an example, the wireless communication circuit 105 may further include a receiving amplifier that amplifies a receiving signal between the duplexers 132, 134 and 136 (e.g., included in the front end module 130) and 142, 144 and 146 and the transceiver 110.

According to an embodiment, the transceiver 110 may include, for example, an RF transceiver or an RF integrated circuit (RF IC). The transceiver 110 may process a signal in a radio frequency (RF) band. As an example, the transceiver 110 may modulate a digital signal output from a modem to a signal in an RF state. As another example, the transceiver 110 may demodulate a signal received in the RF state to a signal in a digital state.

According to an embodiment, the amplifiers 122 to 124 and 172 to 174 may amplify a transmission signal or a reception signal. Each of the amplifiers 122 to 124 and 172 to 174 may be connected to at least one terminal (or port) included in the transceiver 110. Each of a first amplifier 122 and a second amplifier 124 may include a power amplifier (PA) or a transmission amplifier. Each of a third amplifier 172 and a fourth amplifier 174 may include a reception amplifier or a low noise amplifier (LNA). For the convenience of explanation, FIG. 1 illustrates the first amplifier 122 and the second amplifier 124 as an amplifier that amplifies the signal output from the transceiver 110 and only the third amplifier 172 and the fourth amplifier 174 as an amplifier that amplifies the reception signal, but according to various embodiments disclosed in the present disclosure, the electronic device 100 may include a various number of amplifiers to amplify the transmission or reception signal.

According to an embodiment, the front end module 130 may selectively transmit the transmission or reception signal in the wireless frequency band. The front end module 130 may be disposed between the transceiver 110, the amplifiers 122 to 124, or the duplexer 142 to 146 and the antenna 152. The front end module 130 may be a front end module including duplexer (FEMID). The front end module 130 may include at least one duplexer (e.g., the duplexers 132 to 136) and a switch selectively transmitting a signal output from the at least one duplexer.

According to an embodiment, the duplexers 132 to 136 and 142 to 146 may separate the transmission signal or the reception signal. The duplexers 132 to 136 and 142 to 146 may filter a signal in a certain frequency band using a filter having a designated resonant frequency band. The wireless communication circuit 105 illustrated in FIG. 1 may include a plurality of duplexers (e.g., the duplexers 132 to 136) arranged inside the front end module 130 and a plurality of duplexers (e.g., the duplexers 142 to 146) arranged outside the front end module 130, but the wireless communication circuit 105 may include only the duplexers arranged inside the front end module 130 or only the duplexers arranged outside the front end module 130.

According to an embodiment, each of the filters 162 to 166 may filter the signal in the wireless frequency band, which is received from each of the antennas 154 to 156. According to an embodiment, each of the filters 162 to 166 may, for example, and without limitation, include a surface acoustic wave (SAW) filter. The SAW filter may convert a signal, which is an electromagnetic wave at a speed of light, into a surface acoustic wave of a low speed acoustic wave and may extract only a specific frequency. The SAW filter may have a narrow bandwidth of a pass frequency and a superior selective characteristic.

According to various embodiments disclosed in the present disclosure, a process in which the signal output from the transceiver 110 is transmitted through the antenna 152 may be illustrated as follows, without limitation. According to an embodiment, the signal output from the transceiver 110 may be input to the first amplifier 122 and/or the second amplifier 124, and the signal output from the first amplifier 122 and/or the second amplifier 124 may be transmitted to the antenna 152 through at least one duplexer (e.g., the duplexer 142).

According to an embodiment, the transceiver 110 may transmit a signal in various frequency bands to the first amplifier 122 and/or the second amplifier 124. According to an embodiment, the frequency band of the signal output from the transceiver 110 may, for example, and without limitation, be at least one frequency band among frequency bands that are previously specified by 3GPP TS 36.101 as shown in Table 1 below.

TABLE 1

| Band | Transmission (Tx) frequency | Reception (Rx) frequency |
| --- | --- | --- |
| 13 | 777~787 MHz | 746~756 MHz |
| 17 | 704~716 MHz | 734~746 MHz |
| 28 | 703~748 MHz | 758~803 MHz |
| 12 | 699~716 MHz | 729~746 MHz |
| 14 | 788~798 MHz | 758~768 MHz |
| 29 | — | 717~728 MHz |
| 67 | — | 738~758 MHz |
| 68 | 698~728 MHz | 753~783 MHz |

According to an embodiment, the first amplifier 122 or the second amplifier 124 may amplify a signal in two or more frequency bands. In this case, the first amplifier 122 or the second amplifier 124 may include a multi-mode multi-band PA (MMMB PA). As an example, the first amplifier 122 may amplify a signal power in a middle band (MB) and a low band (LB), and the second amplifier 124 may amplify a signal power in a high band (HB). As another example, the first amplifier 122 may amplify the signal power in the high band, the middle band, and the low band. In this case, the wireless communication circuit 105 may not include the second amplifier 124.

According to an embodiment, the signal output from the first amplifier 122 and/or the second amplifier 124 may be transmitted to at least one duplexer among the duplexers 132 to 136 and 142 to 146. According to an embodiment, at least one duplexer among the duplexers 132 to 136 and 142 to 146 may process the signal in one designated frequency band. As an example, referring to Table 1, the first duplexer 142 may process a signal corresponding to the band 28, the second duplexer 144 may process a signal corresponding to the band 13, and the third duplexer 146 may process a signal corresponding to the band 17. As another example, each of the fourth duplexer 132 and the fifth duplexer 134 may respectively process the signal in the middle band and the signal in the low band, which are output from the first amplifier 122, and the sixth duplexer 136 may process the signal in the high band output from the second amplifier 124. According to an embodiment, the signals output from the duplexers 132 to 136 may be transmitted to the antenna 152 depending on corresponding frequency bands using a switch (e.g., the switch 138) included in the front end module 130.

According to various embodiments disclosed in the present disclosure, a process in which the signal received from at least one antenna among the antennas 152 to 156 is transmitted to the transceiver 110 may, for example, be illustrated as follows, without limitation. According to an embodiment, the signal in the specific frequency band, which is received from the antenna 152, may be filtered by at least one duplexer among the duplexers 132 to 136 and 142 to 146, and the filtered signal may be immediately transmitted to the transceiver 110 or may be transmitted to the transceiver 110 through the reception amplifier (not shown).

According to another embodiment, a signal in another frequency band, which is received from at least one antenna among the antennas 154 to 156 may be selectively transmitted to a corresponding filter (e.g., at least one of the filters 162 to 166) using switches 176 and 177 respectively located at input terminals of the filters 162 to 166), the transmitted signal may be filtered based on the resonant frequency band of the corresponding filter, the filtered signal may be transmitted to the third amplifier 172 or the fourth amplifier 174 using switches 178 and 179 respectively located at output terminals of the filters 162 to 166), the transmitted signal may be amplified by a corresponding amplifier, and the amplified signal may be transmitted to the transceiver 110.

According to an embodiment, the transceiver 110 may receive the signal in various frequency bands from at least one of the third amplifier 172 and the fourth amplifier 174. As an example, the transceiver 110 may receive the signal in at least one reception frequency band among the frequency bands shown in Table 1.

Figure 2:
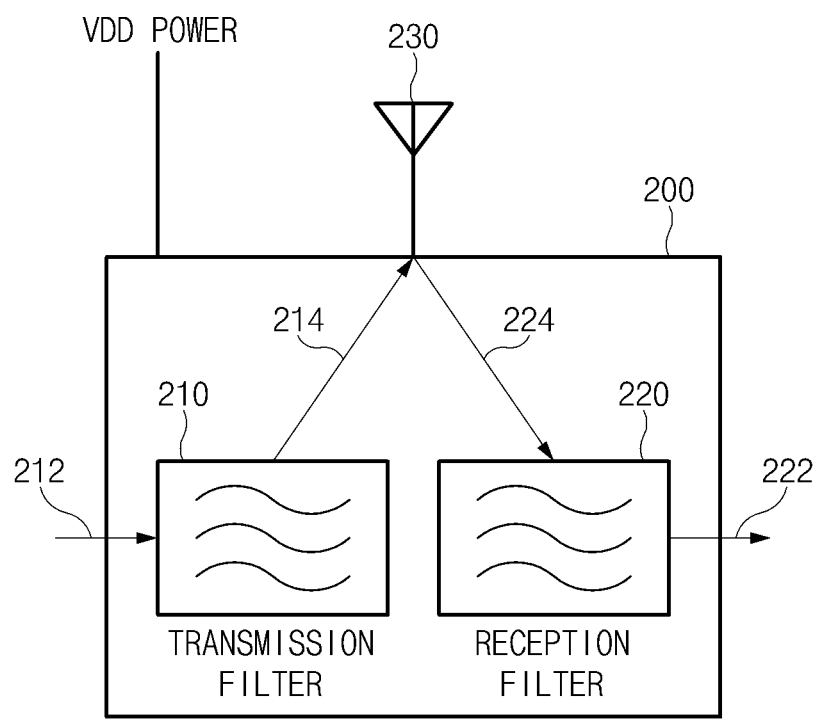
FIG. 2 is a block diagram illustrating a duplexer according to various embodiments.

FIG. 2 is a block diagram illustrating a duplexer 200 according to various embodiments. The duplexer 200 may correspond to one duplexer among the duplexers 132 to 136 and 142 to 146 illustrated in FIG. 1. In addition, an antenna 230 may, for example, and without limitation, correspond to the antenna 152 illustrated in FIG. 1.

Referring to FIG. 2, the duplexer 200 may include a transmission filter 210 and a reception filter 220. In various embodiments disclosed in the present disclosure, a configuration of the duplexer 200 may be changed in various ways. As an example, the duplexer 200 may include further components, or a specific component may be omitted from the duplexer 200.

According to an embodiment, the transmission filter 210 and the reception filter 220 may have the same or different resonant frequency. Each of the transmission filter 210 and the reception filter 220 may, for example, and without limitation, include a SAW filter. In this case, the transmission filter 210 and the reception filter 220 may pass only a signal in a narrow specific frequency band. In addition, in this case, the transmission filter 210 and the reception filter 220 may be implemented with a size smaller than other filters.

According to an embodiment, the transmission filter 210 may filter the transmission signal. The transmission filter 210 may filter the transmission signal transmitted through a transmission path 212 using the designated resonant frequency band. The transmission path 212 may be electrically connected to the transmission amplifier (e.g., at least one amplifier of the first amplifier 122 and the second amplifier 124). The signal transmitted through the transmission path 212 may be, for example, the signal in the specific frequency band among the frequency bands designated in Table 1. The signal filtered by the transmission filter 210 may be output through a transmission path 214 and the antenna 230.

According to an embodiment, the reception filter 220 may filter the reception signal. The reception filter 220 may filter the reception signal received through the antenna 230 and a reception path 224. The signal transmitted through the reception path 224 may, for example, and without limitation, include the signal in the specific frequency band among the frequency bands designated in Table 1. The signal filtered by the reception filter 220 may be transmitted to the reception amplifier (e.g., at least one amplifier of the third amplifier 172 and the fourth amplifier 174) through a reception path 222 or transmitted to the transceiver (e.g., the transceiver 110) without passing through the reception amplifier.

Since each of the transmission filter 210 and the reception filter 220 illustrated in FIG. 2 has the designated resonant frequency band, the duplexer 200 may, for example, and without limitation, process only the signal in the corresponding frequency band. When the electronic device supports the multiple frequency bands, the electronic device (e.g., the electronic device 100) may include the plural duplexers respectively corresponding to the multiple frequency bands as shown in FIG. 1. In this case, a space for mounting the duplexers in the electronic device may be limited. In addition, a material cost increases with the addition of the duplexer.

In the following descriptions of the drawings, an apparatus for supporting multiple frequency bands using a duplexer, which may tune a resonant frequency band of a filter and transmission and reception paths, and a method thereof will be described.

Figure 3:
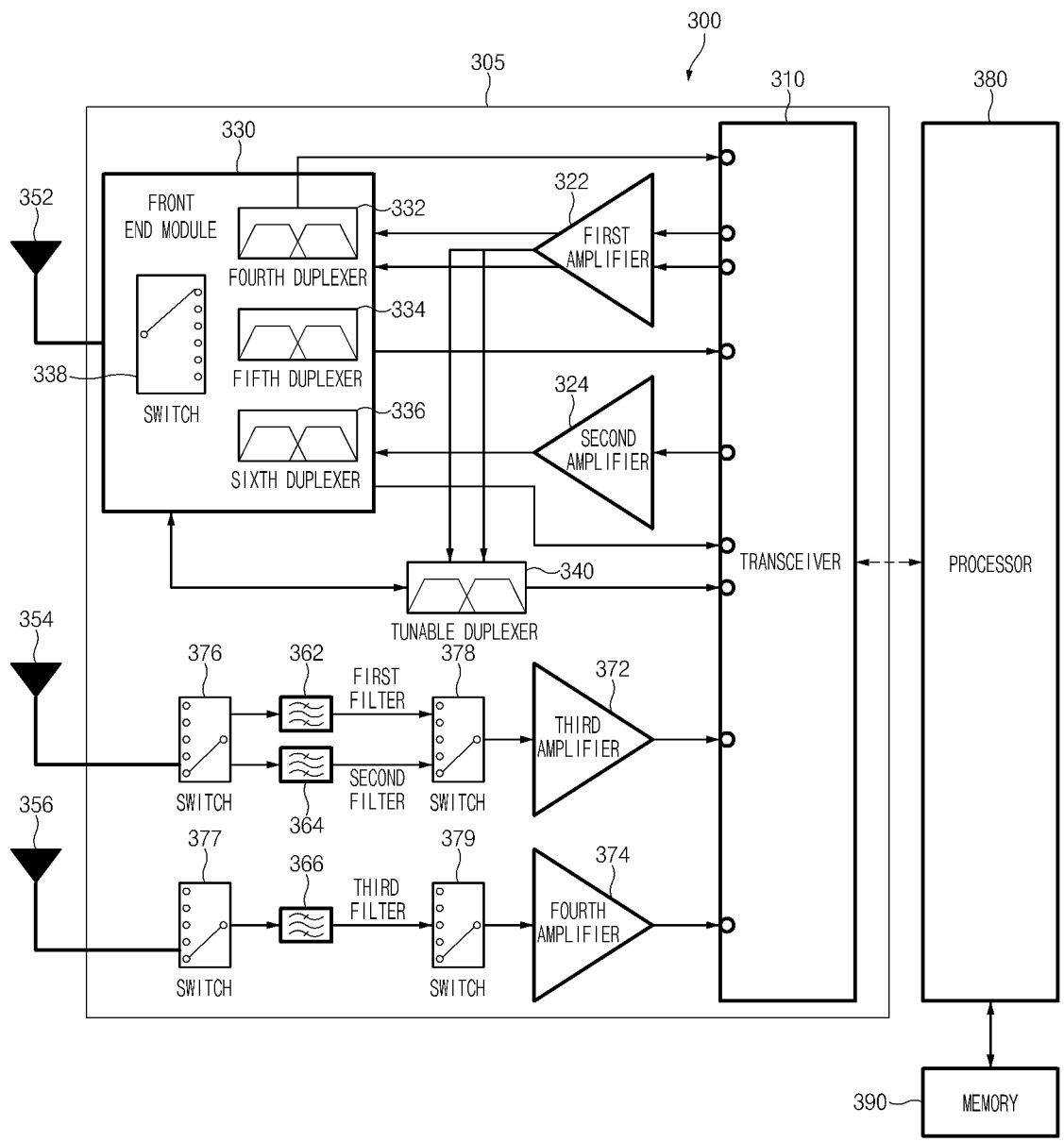
FIG. 3 is a block diagram illustrating an electronic device including a plurality of duplexers according to various embodiments.

FIG. 3 is a block diagram illustrating an electronic device 300 including a plurality of duplexers according to various embodiments. Each of components shown in FIG. 3 may perform the same or similar functions as those of each of components assigned with similar reference numerals illustrated in FIG. 1.

Referring to FIG. 3, the electronic device 300 may include antennas 352, 354 and 356 (e.g., the antennas 152 to 156), a wireless communication circuit 305 (e.g., the wireless communication circuit 105), a processor (e.g., including processing circuitry) 380, and a memory 390. According to various embodiments disclosed in the present disclosure, the configuration of the electronic device 300 may be variously changed.

According to an embodiment, the wireless communication circuit 305 may include a transceiver 310 (e.g., the transceiver 110), amplifiers 322, 324, 372 and 374 (e.g., the amplifiers 122 to 124 and 172 to 174), a front end module 330 (e.g., the front end module 130), filters 362, 364 and 366 (e.g., the filters 162 to 166) and switches 338, 376 and 379 (e.g., the switches 138 and 176 to 179). Since a description on each component is substantially the same or similar as the components included in the wireless communication circuit 105 of FIG. 1 and assigned with the similar reference numerals, details thereof will not be repeated here.

According to an embodiment, the wireless communication circuit 305 may include a duplexer (e.g., a tunable duplexer) 340 that may process multiple frequency bands. Since the duplexer 340 may select a path for a transmission or reception signal depending on the frequency band or tune the frequency band, the wireless communication circuit 305 may process the multiple frequency bands. As an example, the duplexer 340 may transmit a signal in a first frequency band and a signal in a second frequency band different from the first frequency band to the antenna 352 or the front end module 330. As another example, the duplexer 340 may transmit a signal in a third frequency band and a signal in a fourth frequency band different from the third frequency band to the transceiver 310. As illustrated in FIG. 3, since one duplexer (e.g., the duplexer 340) is included in the wireless communication circuit 305 that supports the multiple frequency bands, a manufacturer of the electronic device 300 may reduce a cost arising from a design for the plural duplexers and may plan a design favorable for securing the mounting space.

According to an embodiment, since the duplexer 340 may tune the frequency band that is to be processed by the duplexer 340, the duplexer 340 may be referred to, for example, and without limitation, as a "tunable duplexer". In FIG. 3, the duplexer 340 may be arranged outside the front end module 330, but the duplexer 340 may be arranged inside the front end module 330. Depending on the implementation method, the duplexers 332 to 336 (e.g., the duplexers 132 to 136) may be implemented in one duplexer as the same as the operation principle of the duplexer 340.

According to an embodiment, the processor 380 may include various processing circuitry and control an overall function of the duplexer 340 to process the signal transmitted or received through the antenna 352. The processor 380 may be connected to the front end module 330 or the duplexer 340. The processor 380 may include various processing circuitry, such as, for example, and without limitation, at least one of a dedicated processor, a central processing unit (CPU), an application processor (AP), a communication processor (CP), a modem, and/or a baseband processor, or the like.

According to an embodiment, the processor 380 may control the duplexer 340 based on the designated frequency band such that the duplexer 340 is selectively connected to one path among a plurality of paths corresponding to the multiple frequency bands. According to an embodiment, the processor 380 may control the duplexer 340 to allow the duplexer 340 to filter the signal in the designated frequency band. The processor 380 may store data into or load the data from the memory 390.

According to an embodiment, the memory 390 may store an instruction or data to allow the processor 380 to control an operation of the duplexer 340. In addition, the memory 390 may store information about the multiple frequency bands that may be supported by the electronic device 300. As an example, the memory 390 may store information about the frequency bands designated in Table 1 and duplexer control instructions corresponding to the frequency bands.

Figure 4:
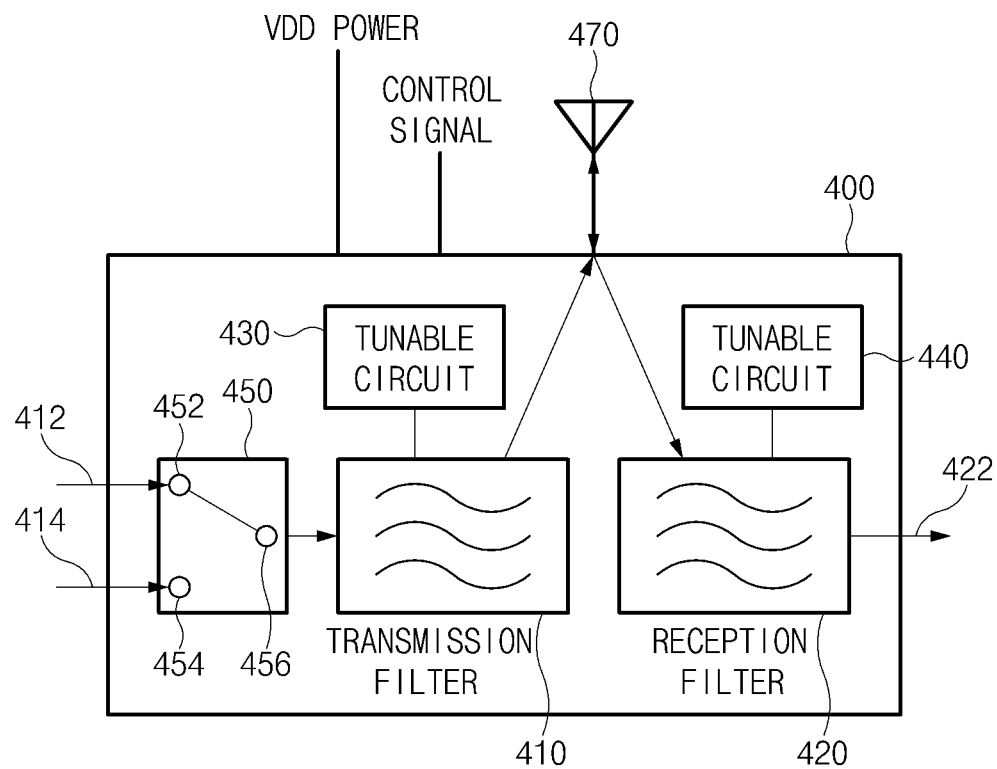
FIG. 4 is a block diagram illustrating a duplexer including a switch according to various embodiments.

FIG. 4 is a block diagram illustrating a duplexer 400 including a switch according to various embodiments. The duplexer 400 illustrated in FIG. 4 may correspond to the duplexer 340 illustrated in FIG. 3.

Referring to FIG. 4, the duplexer 400 (e.g., the duplexer 200) may include a transmission filter 410 (e.g., the transmission filter 210), a reception filter 420 (e.g., the reception filter 220), and tunable circuits (or tunable elements) 430 and 440 in order to support multiple frequency bands. Each of components illustrated in FIG. 4 may perform the same or similar functions as those of each of components assigned with similar reference numerals and shown in FIG. 2.

According to an embodiment, the transmission filter 410 may filter a transmission signal in multiple frequency bands, and the reception filter 420 may filter a reception signal in multiple frequency bands.

According to an embodiment, the transmission filter 410 may be electrically connected to the tunable circuit 430 that may tune the resonant frequency band. The resonant frequency band of the transmission filter 410 may vary by the tunable circuit 430. The transmission filter 410 may be electrically connected to a plurality of transmission paths 412 and 414 to obtain signals in multiple frequency bands.

According to an embodiment, the transmission paths 412 and 414 may be electrically connected to at least one transmission amplifier. As an example, when the signals in multiple frequency bands are output from one transmission amplifier (e.g., MMMB PA), the transmission paths 412 and 414 may be connected to one transmission amplifier that outputs the signals in multiple frequency bands. As another example, when the signals in multiple frequency bands are output from each corresponding amplifier (e.g., HB PA, MB PA, or LB PA), the transmission paths 412 and 414 may be connected to each corresponding amplifier.

According to an embodiment, the tunable circuit 430 may be set to tune the resonant frequency band of the transmission filter 410. According to an embodiment, the tunable circuit 430 may include at least one capacitor. When a value of the at least one capacitor is changed, the resonant frequency band may vary. In this case, the processor (e.g., the processor 380) may adjust the value of the capacitor of the tunable circuit 430 using a combination of capacitors, which is obtained based on a capacitance of the capacitor and/or the number of capacitors, thereby tuning the resonant frequency band of the transmission filter 410.

According to an embodiment, the duplexer 400 may include the switch 450 to select at least one transmission path of the transmission paths 412 and 414. According to an embodiment, the switch 450 may be placed at a previous stage of the transmission filter 410 and selectively connected to the paths for the signals transmitted to the transmission filter 410. The switch 450 may include a first terminal 452 electrically connected to the transmission path 412 corresponding to a first frequency band, a second terminal 454 electrically connected to the transmission path 414 corresponding to a second frequency band, and a third terminal 456 selectively connected to the first terminal 452 and the second terminal 454. Each of the first frequency band and the second frequency band may include one frequency band among the frequency bands shown in Table 1. The third terminal 456 may be electrically connected to an input terminal of the transmission filter 410.

According to an embodiment, the switch 450 and the transmission filter 410 may include one device, one circuit, or one module. In FIG. 4, the switch 450 may include two input terminals (e.g., the first terminal 452 and the second terminal 454), but the number of input terminals of the switch 450 may be changed in various ways. As an example, the switch 450 may further include an additional input terminal in addition to the first terminal 452 and the second terminal 454. The switch 450 may be implemented, for example, and without limitation, by a single pole double throw (SPDT), a single pole 3 throw (SP3T), SP4T, or the like. The duplexer 400 may block the path of the signal input to the transmission filter 410 using the switch 450, and thus improved isolation characteristics may be provided.

According to an embodiment, the duplexer 400 may be implemented by taking into account an insertion loss (IL) minimum depending on each frequency band in the transmission amplifier (e.g., the first amplifier 322), a linearity, and a maximum output. As an example, it is assumed that the electronic device 300 outputs a signal in transmission frequency band of the band 13 (777~787 MHz), the band 17 (704~716 MHz), and the band 28 (703~748 MHz). Since the frequency band of the band 13 does not overlap with the frequency band of the band 17 and the band 28, the duplexer 400 may be designed such that the signal corresponding to the band 13 is obtained through the transmission path 412 and the signal corresponding to at least one frequency band of the band 17 and the band 28 is obtained through the transmission path 414.

According to an embodiment, the electronic device (e.g., the electronic device 300) may control the resonant frequency band of the reception filter 420. The reception filter 420 may be electrically connected to the tunable circuit 440 that may tune the resonant frequency band. The resonant frequency band of the reception filter 420 may vary by the tunable circuit 440.

According to an embodiment, a reception path 422 (e.g., the reception path 222) may be electrically connected to an output terminal of the reception filter 420 and may output a signal in two or more frequency bands. The output signal may be transmitted to the reception amplifier.

According to an embodiment, the tunable circuit 440 may tune a different resonant frequency band of the reception filter 420 using a similar principle to the tunable circuit 430. As an example, the tunable circuit 430 may include at least one capacitor. The duplexer 400 may filter a signal not only in a specific frequency band but also in another frequency band through the transmission filter 410 and the reception filter 420 using the tunable circuit 430 and the tunable circuit 440.

According to an embodiment, the processor 380 may control operations of the switch 450 and the tunable circuits 430 and 440 using a control signal or a control logic. The control logic may include, for example, and without limitation, a general purpose input output (GPIO), a mobile industry processor interface (MIPI), and/or an inter-integrated circuit (I2C), or the like. According to an embodiment, the control logic may, for example, and without limitation, be designed as shown in Table 2 below to maximize and/or increase an isolation characteristic between the transmission frequency and the reception frequency.

TABLE 2

| Control logic | Transmission frequency | Reception frequency | Difference between frequencies |
|---|---|---|---|
| 00 | Band 28B (725.5~748 MHz) | Band 28B (780.5~803 MHz) | 32.5 MHz |
| 01 | Band 28A (703~725.5 MHz) | Band 28A (758~780.5 MHz) | 32.5 MHz |
| 10 | Band 13 (777~787 MHz) | Band 13 (746~756 MHz) | 21 MHz |
| 11 | Band 17 (704~716 MHz) | Band 17 (734~746 MHz) | 18 MHz |

Figure 5:
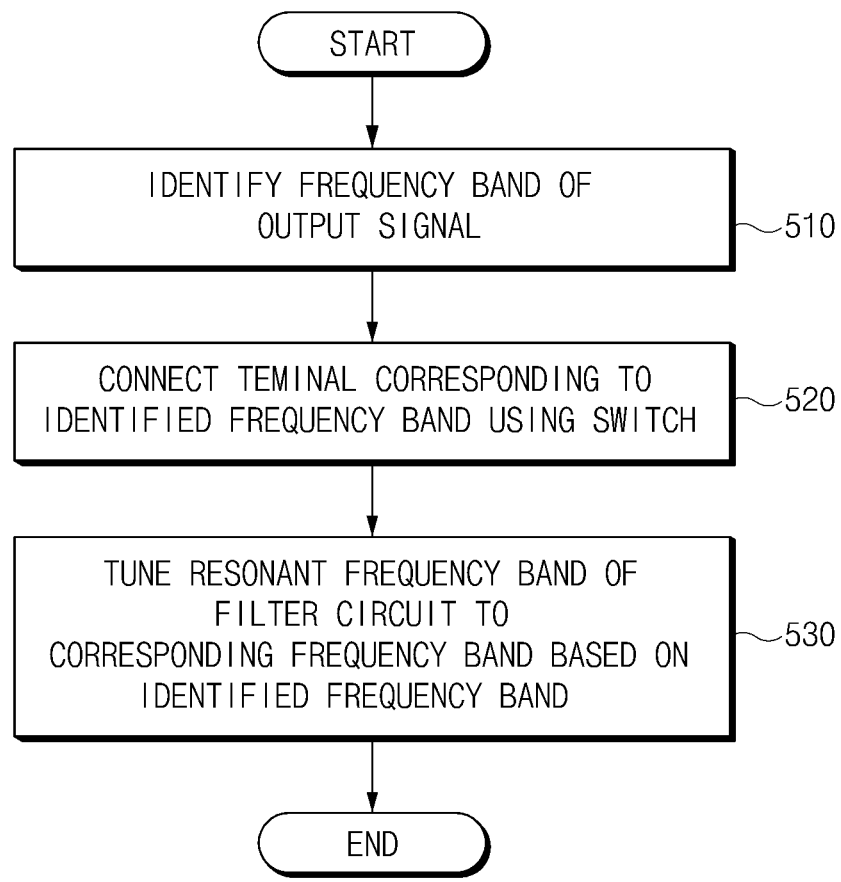
FIG. 5 is a flowchart illustrating an operation of an electronic device to support a plurality of frequency bands according to various embodiments.

FIG. 5 is a flowchart illustrating an operation of an electronic device to support multiple frequency bands according to various embodiments. Operations illustrated in FIG. 5 may be performed by an electronic device (e.g., the electronic device 300) or a processor (e.g., the processor 380) included in the electronic device.

According to various embodiments disclosed in the present disclosure, the electronic device may select the transmission path and/or control the resonant frequency based on a frequency band determined from the frequency bands.

Referring to FIG. 5, in operation 510, the electronic device (e.g., the processor 380) may identify a frequency band of an output signal. As an example, the electronic device may determine whether the signal corresponding to the first frequency band is output and may determine that the signal in the second frequency band is output when the signal in the first frequency band is not output. As another example, the electronic device may first determine whether the signal in the second frequency band is output. According to various embodiments of the present disclosure, the electronic device may determine whether the signal corresponding to one frequency band among at least three or more frequency bands is output. As an example, when the output signal does not correspond to the first frequency band and the second frequency band, the electronic device may determine whether the signal corresponding to the third frequency band is output.

According to an embodiment, the signal in the first frequency band and the signal in the second frequency band may be transmitted to the transmission filter (e.g., the transmission filter 410) through different paths from each other. As an example, the signal in the first frequency band may be transmitted through a first transmission path (e.g., the transmission path 412), and the signal in the second frequency band may be transmitted through a second transmission path (e.g., the transmission path 414). According to an embodiment, the first frequency band and the second frequency band may include frequency bands that do not overlap with each other. As an example, the first frequency band may include the band 13, and the second frequency band may include at least one of the band 17 and the band 28. As another example, the first frequency band and the second frequency band may include frequencies in which some frequencies overlap with each other or are adjacent to each other.

In operation 520, the electronic device may connect the terminals corresponding to the identified frequency band using a switch (e.g., the switch 450). As an example, when the identified output signal is the signal in the first frequency band, the electronic device may connect a first terminal (e.g., the first terminal 452) to a third terminal (e.g., the third terminal 456), which are included in the switch (e.g., the switch 450) electrically connected to the transmission filter. In other words, the electronic device may control the switch using the control signal such that the first transmission path is connected to the transmission filter and the second transmission path is blocked. As another example, when the identified output signal is the signal in the second frequency band, the electronic device may connect a second terminal (e.g., the second terminal 454) to the third terminal, which are included in the switch. In other words, the electronic device may control the switch using the control signal such that the second transmission path is connected to the transmission filter and the first transmission path is blocked.

In operation 530, the electronic device may tune a resonant frequency band of a filter circuit (e.g., the transmission filter 410) to a corresponding frequency band based on the identified frequency band. As an example, the electronic device may tune the resonant frequency band of the filter circuit to the frequency band corresponding to the identified frequency band of the first frequency band and the second frequency band using a tunable circuit (e.g., the tunable circuit 430) that may tune the resonant frequency band of the filter circuit.

The operations illustrated in FIG. 5 may be modified depending on various embodiments disclosed in the present disclosure, and the order of the operations may be changed. In addition, the operations are not necessarily performed one after another, and the operations may be substantially simultaneously performed.

Figure 6:
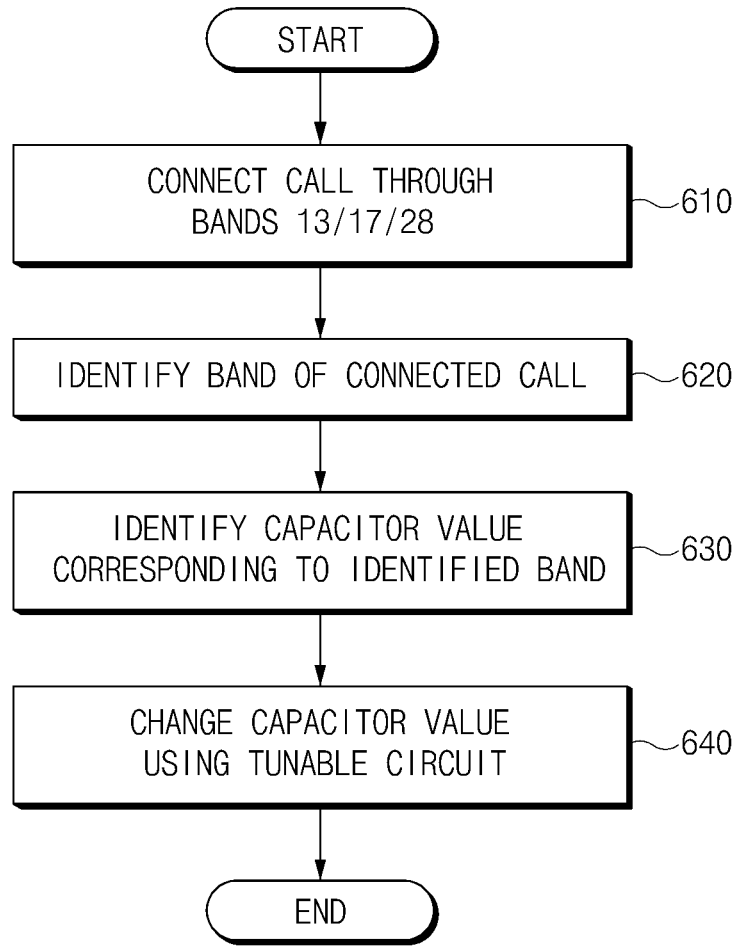
FIG. 6 is a flowchart illustrating an operation of an electronic device to control a capacitor value depending on a frequency band according to various embodiments.

FIG. 6 is a flowchart illustrating an operation of an electronic device to control a capacitor value depending on a frequency band according to various embodiments. Operations illustrated in FIG. 6 may be performed by an electronic device (e.g., the electronic device 300) or a processor (e.g., the processor 380) included in the electronic device.

According to various embodiments disclosed in the present disclosure, when a call is connected in a specific frequency band, the electronic device may select a transmission/reception capacitor value corresponding to the connected frequency band among the frequency bands.

Referring to FIG. 6, in operation 610, the electronic device (e.g., the processor 380) may connect the call through band 13, 17, or 28. The bands 13, 17, and 28 may refer, for example, to the bands designated in Table 1. The band 28 may be divided into the band 28A and the band 28B as shown in Table 2 according to various embodiments. FIG. 6 illustrates the bands 13, 17, and 28, but various frequency bands may be applied. As an example, the electronic device may connect the call through at least one frequency band among the bands 12, 14, 29, 67, and 68. The operation of connecting the call may include, for example, an operation that receives a call connection request from a network in which the electronic device is included, an operation that identifies a state of the network, and an operation that attempts to connect a call through the network when the identified network state satisfies a predetermined condition.

In operation 620, the electronic device may identify a band of the connected call. According to various embodiments of the present disclosure, the electronic device may identify the band of the connected call based on various orders. As an example, the electronic device may determine whether the call is connected through the band 13, and then the electronic device may determine whether the call is connected in order of the band 17, the band 28A, and the band 28B. As another example, the electronic device may determine whether the call is connected through the band 17, and then the electronic device may determine whether the call is connected in order of the band 28A, the band 28B, and the band 13.

In operation 630, the electronic device may identify the capacitor value corresponding to the identified band. According to an embodiment, the electronic device may identify the transmission/reception capacitor value corresponding to the identified band using a look-up table stored in a memory (e.g., the memory 390). As an example, when the call is connected through the band 13, the electronic device may identify the capacitor value corresponding to the band 13 using the look-up table.

In operation 640, the electronic device may change the transmission/reception capacitor value using a tunable circuit (e.g., the tunable circuit 430). As an example, when the call is connected through the band 28A, the electronic device may change the capacitor value of the tunable circuit to the capacitor value corresponding to the band 28A.

The operations illustrated in FIG. 6 may be modified depending on various embodiments disclosed in the present disclosure, and the order of the operations may be changed. As an example, the electronic device may determine the frequency bands to which the call is connected in order of the bands 17, 13, 28A, and 28B or in reverse order. In addition, the operations are not necessarily performed one after another, and the operations may be substantially simultaneously performed.

The electronic device may include a duplexer to process signals not only in a plurality of transmission frequency bands but also in a plurality of reception frequency bands. The following descriptions are related to a duplexer that supports both the transmission frequency bands and the reception frequency bands.

Figure 7:
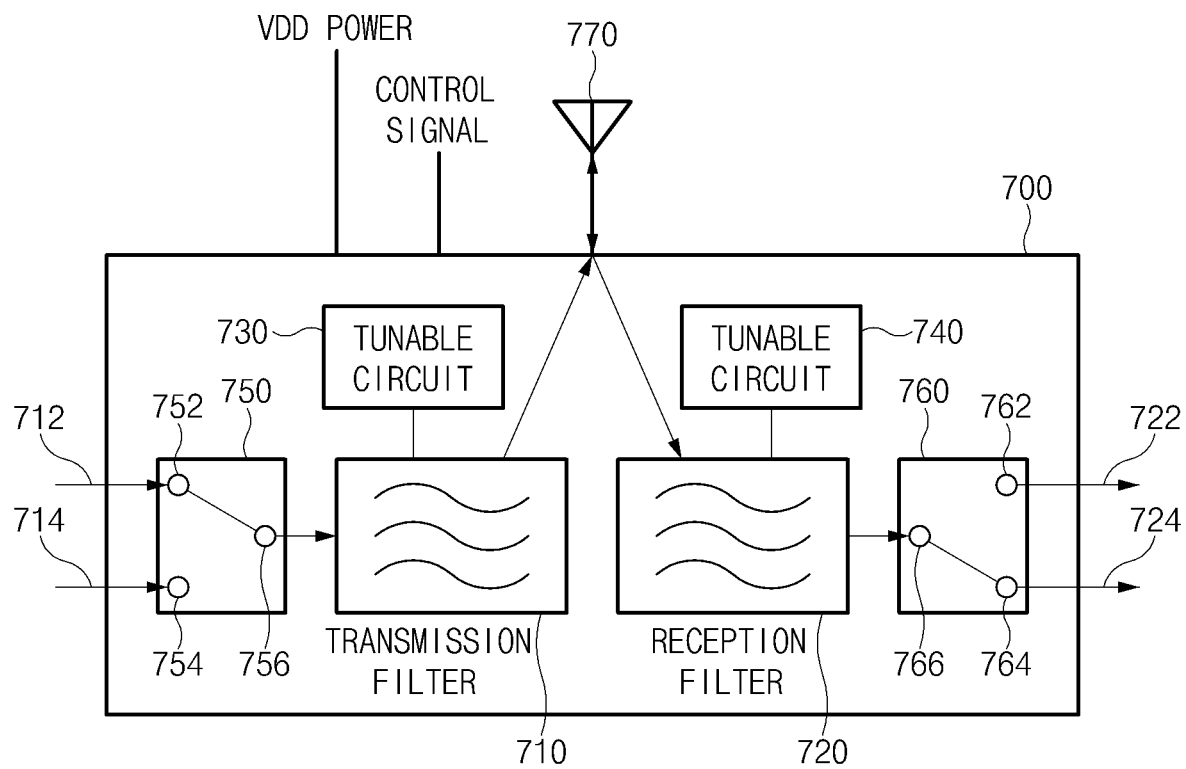
FIG. 7 is a block diagram illustrating another duplexer including a switch according to various embodiments.

FIG. 7 is a block diagram illustrating another duplexer 700 including a switch according to various embodiments. The duplexer 700 illustrated in FIG. 7 may correspond to the duplexer 340 illustrated in FIG. 3.

Referring to FIG. 7, the duplexer 700 (e.g., the duplexer 400) may include a transmission filter 710, a reception filter 720, switches 750 and 760, and tunable circuits 730 and 740. Each of components illustrated in FIG. 7 may perform the same or similar functions as those of each of components assigned with similar reference numerals and illustrated in FIG. 4. As an example, since a configuration and an operation of each of the transmission filter 710, the reception filter 720, the tunable circuits 730 and 740, and the switch 750 are the same or similar as those of each of the transmission filter 410, the reception filter 420, the tunable circuits 430 and 440, and the switch 450 illustrated in FIG. 4, details thereof will not be repeated here.

According to an embodiment, the reception filter 720 may output a signal obtained from an antenna 770 (e.g., the antenna 470) through a plurality of paths 722 and 724. According to an embodiment, the reception filter 720 may be electrically connected to the tunable circuit 740 that may tune the resonant frequency band. The resonant frequency band of the reception filter 720 may vary by the tunable circuit 740.

According to an embodiment, the reception paths 722 and 724 may be electrically connected to at least one reception amplifier. As an example, when signals in multiple frequency bands (e.g., the third frequency band and the fourth frequency band) are transmitted to corresponding reception amplifiers, respectively, the reception paths 722 and 724 may connected to corresponding reception amplifiers, respectively. In this case, the signal in the third frequency band may be transmitted through the reception path 722, and the signal in the fourth frequency band may be transmitted through the reception path 724. According to an embodiment, the third frequency band and the fourth frequency band may include frequency bands which are not overlapped with each other. As an example, among the frequency bands shown in Table 1, the third frequency band may include at least one frequency band of the band 13 and the band 17, and the fourth frequency band may include the band 28. According to an embodiment, the third frequency band may overlap with or may be adjacent to at least a portion of the first frequency band, and the fourth frequency band may overlap with or may be adjacent to at least a portion of the second frequency band.

According to an embodiment, the tunable circuit 740 may tune the resonant frequency band of the reception filter 720. According to an embodiment, the tunable circuit 740 may include at least one capacitor. In this case, the processor (e.g., the processor 380) may tune the resonant frequency band of the reception filter 720 using a combination of capacitors, which is obtained based on a capacitance of the capacitor and/or the number of capacitors.

According to an embodiment, the switch 760 may be placed at a next stage of the reception filter 720 and selectively connected to the paths for the signals transmitted to a transceiver (e.g., the transceiver 310). The switch 760 may include a fourth terminal 762 electrically connected to the reception path 722 corresponding to the third frequency band, a fifth terminal 764 electrically connected to the reception path 724 corresponding to the fourth frequency band, and a sixth terminal 766 selectively connected to the fourth terminal 762 and the fifth terminal 764. The sixth terminal 766 may be electrically connected to an output terminal of the reception filter 720.

According to an embodiment, the switch 760 and the reception filter 720 may constitute one device, one circuit, or one module. In FIG. 7, the switch 760 may include two output terminals (e.g., the fourth terminal 762 and the fifth terminal 764), but the number of output terminals of the switch 760 may be changed in various ways. As an example, the switch 760 may further include an additional output terminal in addition to the fourth terminal 762 and the fifth terminal 764. The switch 760 may be implemented to have various numbers of terminals, for example, and without limitation, SPDT, SP3T, SP4T, or the like. The duplexer 700 may block the path of the signal output from the reception filter 720 using the switch 760, and thus the isolation characteristics of the electronic device (e.g., the electronic device 300) may be provided.

According to an embodiment, the duplexer 700 may be designed to maximize a performance of the reception filter 720. As an example, it is assumed that the electronic device 300 of FIG. 3 receives a signal in reception frequency band of the band 13 (746~756 MHz), the band 17 (734~746 MHz), and the band 28 (758~803 MHz). Since the frequency band of the band 13 overlaps with the frequency band of the band 17 and the frequency band of the band 28 does not overlap with the frequency band of the band 13 and the frequency band of the band 17, the duplexer 700 may be designed such that the signal in the frequency band corresponding to at least one of the band 13 and the band 17 is transmitted through the reception path 722 and the signal corresponding to the band 28 is transmitted through the reception path 724.

According to an embodiment, the processor (e.g., the processor 380) may include various processing circuitry and control operations of the switch 760 and the tunable circuit 740 using a control signal or a control logic. The control logic may include, for example, and without limitation, the GPIO, the MIPI, and/or the I2C, or the like. According to an embodiment, when the signal corresponding to the third frequency band is output, the processor may connect the fourth terminal 762 to the sixth terminal 766 of the switch 760. In other words, the processor may control the switch 760 using the control signal such that the reception filter 720 is connected to the reception path 722 and the reception path 724 is blocked. As another example, the processor may connect the fifth terminal 764 to the sixth terminal 766 of the switch 760. In other words, the processor may control the switch 760 using the control signal such that the reception filter 720 is connected to the reception path 724 and the reception path 722 is blocked.

According to an embodiment, the electronic device (e.g., the electronic device 300) may support, for example, a carrier aggregation (CA). In this case, the electronic device may support simultaneous transmission and reception of signals in multiple frequency bands. When the electronic device performs a CA operation, the processor (e.g., the processor 380) may tune the resonant frequency band of the transmission filter 710 and the reception filter 720 to two or more frequency bands using the tunable circuits 730 and 740. As an example, when the electronic device supports a downlink CA having a combination of the band 13 (746~756 MHz) and the band 17 (734~746 MHz), a combination of the band 17 and the band 28 (758~803 MHz), or a combination of the band 28 and the band 17, the processor may control the tunable circuit 740 such that the resonant frequency band of the reception filter 720 includes the frequency of 734~803 MHz. As another example, when the electronic device supports an uplink CA having a combination of the band 13 (777~787 MHz) and the band 17 (704~716 MHz), a combination of the band 17 and the band 28 (703~748 MHz), or a combination of the band 28 and the band 17, the processor may control the tunable circuit 730 such that the resonant frequency band of the transmission filter 710 includes the frequency of 704~787 MHz.

As described above, the electronic device 300 may include at least one processor (e.g., 380), at least one antenna (e.g., the antennas 352 to 356), and the wireless communication circuit (e.g., the wireless communication circuit 305) electrically connected to the at least one processor and the at least one antenna, the wireless communication circuit may include the switch (e.g., the switch 450) including the first terminal (e.g., the terminal 452) electrically connected to the path corresponding to the first frequency band, the second terminal (e.g., the terminal 454) electrically connected to the path corresponding to the second frequency band, and the third terminal (e.g., the terminal 456) selectively connected to one terminal of the first terminal and the second terminal and the filter circuit (e.g., the transmission filter 410) connected between the third terminal and the at least one antenna and having the designated resonant frequency band, and the wireless communication circuit may be set to selectively transmit the signal in one corresponding frequency band of the signal in the first frequency band and the signal in the second frequency band based on the terminal, which is connected to the third terminal, between the first and second terminals.

According to an embodiment, the electronic device may further include the tunable circuit (e.g., the tunable circuit 430) configured to tune the resonant frequency band of the filter circuit to one corresponding frequency band between the first frequency band and the second frequency band based on the terminal, which is connected to the third terminal, between the first and second terminals.

According to an embodiment, the tunable circuit may include at least one capacitor and may be configured to tune the resonant frequency band of the filter circuit using the at least one capacitor.

According to an embodiment, the electronic device may be configured to support the carrier aggregation (CA) using the first frequency band and the second frequency band, and the tunable circuit may be set to tune the resonant frequency band of the filter circuit to the first frequency band and the second frequency band.

According to an embodiment, a path (e.g., the transmission path 412) corresponding to the first frequency band may be electrically connected to a first transmission amplifier (e.g., the first amplifier 322), and a path (e.g., the transmission path 414) corresponding to the second frequency band may be electrically connected to a second transmission amplifier (e.g., the second amplifier 324).

According to an embodiment, the path corresponding to the first frequency band and the path corresponding to the second frequency band may be connected to one transmission amplifier (e.g., the first amplifier 322 or the second amplifier 324).

According to an embodiment, the switch and the filter circuit may be included in one module.

According to an embodiment, the wireless communication circuit may further include a switch (e.g., the switch 760) including a fourth terminal (e.g., the terminal 762) electrically connected to the path corresponding to the third frequency band, a fifth terminal (e.g., the terminal 764) electrically connected to the path corresponding to the fourth frequency band, and a sixth terminal (e.g., the terminal 766) selectively connected to the fourth terminal or the fifth terminal and another filter circuit (e.g., the reception filter 720) electrically connected between the sixth terminal and at least one antenna and having another designated resonant frequency band, and the wireless communication circuit may be set to selectively receive the signal in one corresponding frequency band of the signal in the third frequency band and the signal in the fourth frequency band based on the terminal, which is connected to the sixth terminal, between the fourth and fifth terminals.

According to an embodiment, the electronic device may further include another tunable circuit (e.g., the tunable circuit 740) configured to tune another designated resonant frequency band to one corresponding frequency band between the third frequency band and the fourth frequency band based on the terminal, which is connected to the sixth terminal, between the fourth and fifth terminals.

According to an embodiment, the third frequency band may overlap with at least a portion of the first frequency band, and the fourth frequency band may overlap with at least a portion of the second frequency band.

As described above, the duplexer (e.g., the duplexer 700) may include a switch (e.g., the switch 750) including plural terminals (e.g., the terminals 752 and 754) connected to plural paths corresponding to multiple frequency bands and one terminal (e.g., the terminal 756) selectively connected to one terminal among the terminals, a transmission filter circuit (e.g., the transmission filter 710) having a designated first resonant frequency band and filtering the signal output from the one terminal, and a reception filter circuit (e.g., the reception filter 720) having a designated second resonant frequency band and filtering the signal output from the at least one antenna.

According to an embodiment, the duplexer may further include the tunable circuit (e.g., the tunable circuit 730) electrically connected to the transmission filter circuit and set to tune the first resonant frequency band of the transmission filter circuit.

According to an embodiment, the duplexer may further include another switch (e.g., the switch 760) including other plural terminals (e.g., the terminals 762 and 764) connected to other plural paths corresponding to other multiple frequency bands and one terminal (e.g., the terminal 766) selectively connected to one terminal among the other plural terminals, and the one terminal selectively connected to one of the other plural terminals may be electrically connected to the reception filter circuit.

According to an embodiment, the duplexer may further include another tunable circuit (e.g., the tunable circuit 740) electrically connected to the reception filter circuit and tuning the designated second resonant frequency band of the reception filter circuit.

As described above, the electronic device (e.g., the electronic device 300) may include at least one antenna (e.g., the antennas 352 to 356), the first amplifier (e.g., the first amplifier 322) corresponding to the first frequency band, the second amplifier (e.g., the first amplifier 324) corresponding to the second frequency band, the switch (e.g., the switch 450) including the first terminal (e.g., the terminal 452) electrically connected to the first amplifier, the second terminal (e.g., the terminal 454) electrically connected to the second amplifier, and the third terminal (e.g., the terminal 456) selectively connected to the first terminal or the second terminal, the filter circuit (e.g., the transmission filter 410) electrically connected between the third terminal and the at least one antenna and having the designated resonant frequency band, the tunable circuit (e.g., the tunable circuit 430) electrically connected to the filter circuit and tuning the designated resonant frequency band of the filter circuit to the first frequency band or the second frequency band, and the processor (e.g., the processor 380). The processor may electrically connect the first terminal to the third terminal of the switch when the signal is output using the first amplifier, the processor may electrically connect the second terminal to the third terminal of the switch when the signal is output using the second amplifier, and the processor may be set to tune the designated resonant frequency band to the corresponding frequency band between the first frequency band and the second frequency band using the tunable circuit based on the terminal, which is connected to the third terminal, between the first and second terminals.

According to an embodiment, the filter circuit and the switch may be included in one module. According to an embodiment, the processor may include the CP or the AP.

According to an embodiment, the electronic device may include a first reception amplifier corresponding to the third frequency band, a second reception amplifier corresponding to the fourth frequency band, another switch (e.g., the switch 760) including a fourth terminal (e.g., the terminal 762) electrically connected to the first reception amplifier, a fifth terminal (e.g., the terminal 764) electrically connected to the second reception amplifier, and a sixth terminal (e.g., the terminal 766) selectively connected to the fourth terminal or the fifth terminal, and another filter circuit (e.g., the reception filter 720) electrically connected between the sixth terminal and at least one antenna and having another designated resonant frequency band.

According to an embodiment, the electronic device may further include another tunable circuit (e.g., the tunable circuit 740) to tune another designated resonant frequency band to the third frequency band or the fourth frequency band. The processor may electrically connect the fourth terminal to the sixth terminal of the another switch when the signal corresponding to the third frequency band is received, the processor may electrically connect the fifth terminal to the sixth terminal of the another switch when the signal corresponding to the fourth frequency band is received, and the processor may be set to tune the another designated resonant frequency band to the corresponding frequency band between the third frequency band and the fourth frequency band based on the terminal, which is connected to the sixth terminal, between the fourth and fifth terminals.

The electronic device may use a quadplexer that separates signals in four frequency bands based on a similar principle to the configuration and the operation described above with reference to FIGS. 3 to 7.

Figure 8:
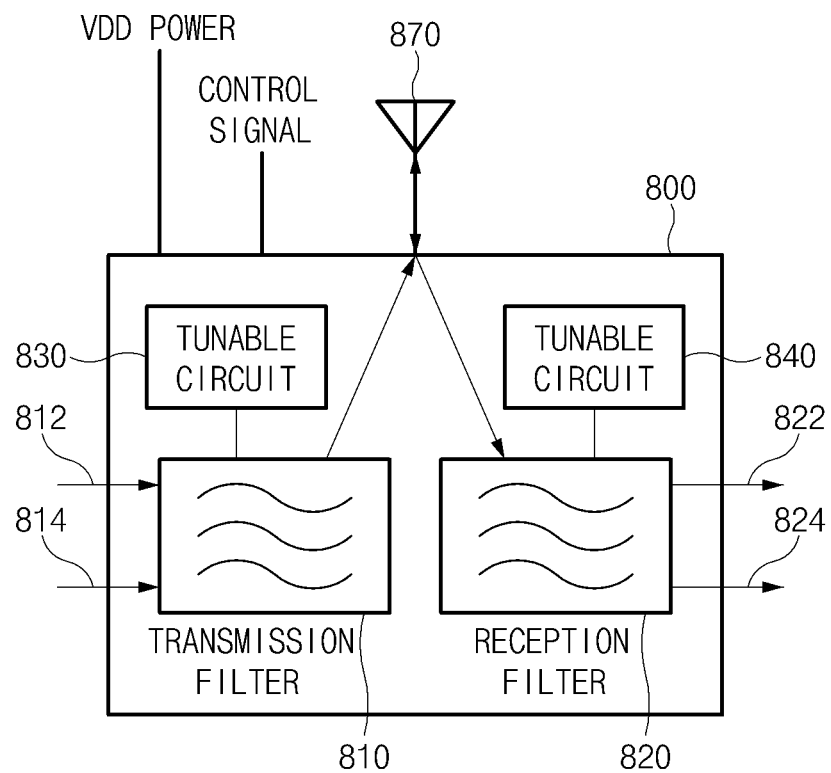
FIG. 8 is a block diagram illustrating a quadplexer according to various embodiments.

FIG. 8 is a block diagram illustrating a quadplexer 800 according to various embodiments. The quadplexer 800 illustrated in FIG. 8 may be arranged outside or inside the front end module 330 as the duplexer 340 of FIG. 3.

Referring to FIG. 8, the quadplexer 800 may include a transmission filter 810, a reception filter 820, and tunable circuits 830 and 840.

According to an embodiment, the transmission filter 810 may filter signals in two or more frequency bands different from each other, which are received through transmission paths 812 and 814. Based on the same principle, the reception filter 820 may filter signals in two or more frequency bands different from each other and transmit the signals to a reception amplifier through reception paths 822 and 824.

The quadplexer 800 may be designed such that frequencies of the signals transmitted through the transmission paths 812 and 814 and the reception paths 822 and 824 are not overlapped with each other or partially overlapped with each other. As an example, referring to Table 2, the signal in the transmission frequency band of the band 13 may be transmitted through the transmission path 812, the signal in the transmission frequency band of the band 17 or the band 28 may be transmitted through the transmission path 814, the signal in the reception frequency band of the band 13 or the band 17 may be transmitted through the reception path 822, and the signal in the reception frequency band of the band 28 may be transmitted through the reception path 824. According to an embodiment, the transmission paths 812 and 814 or the reception paths 822 and 824 may be connected to at least one transmission amplifier or at least one reception amplifier.

According to an embodiment, the tunable circuit 830 may be configured to tune a resonant frequency band of the transmission filter 810 based on the frequency band of the signal transmitted through the transmission paths 812 and 814. Based on the same principle, the tunable circuit 840 may be configured to tune a resonant frequency band of the reception filter 820. A processor (e.g., the processor 380) electrically connected to the quadplexer 800 may control the tunable circuit 830 or the tunable circuit 840 by taking into account a wireless frequency band of the signal output through an antenna 870 or the signal received through the antenna 870.

Figure 9:
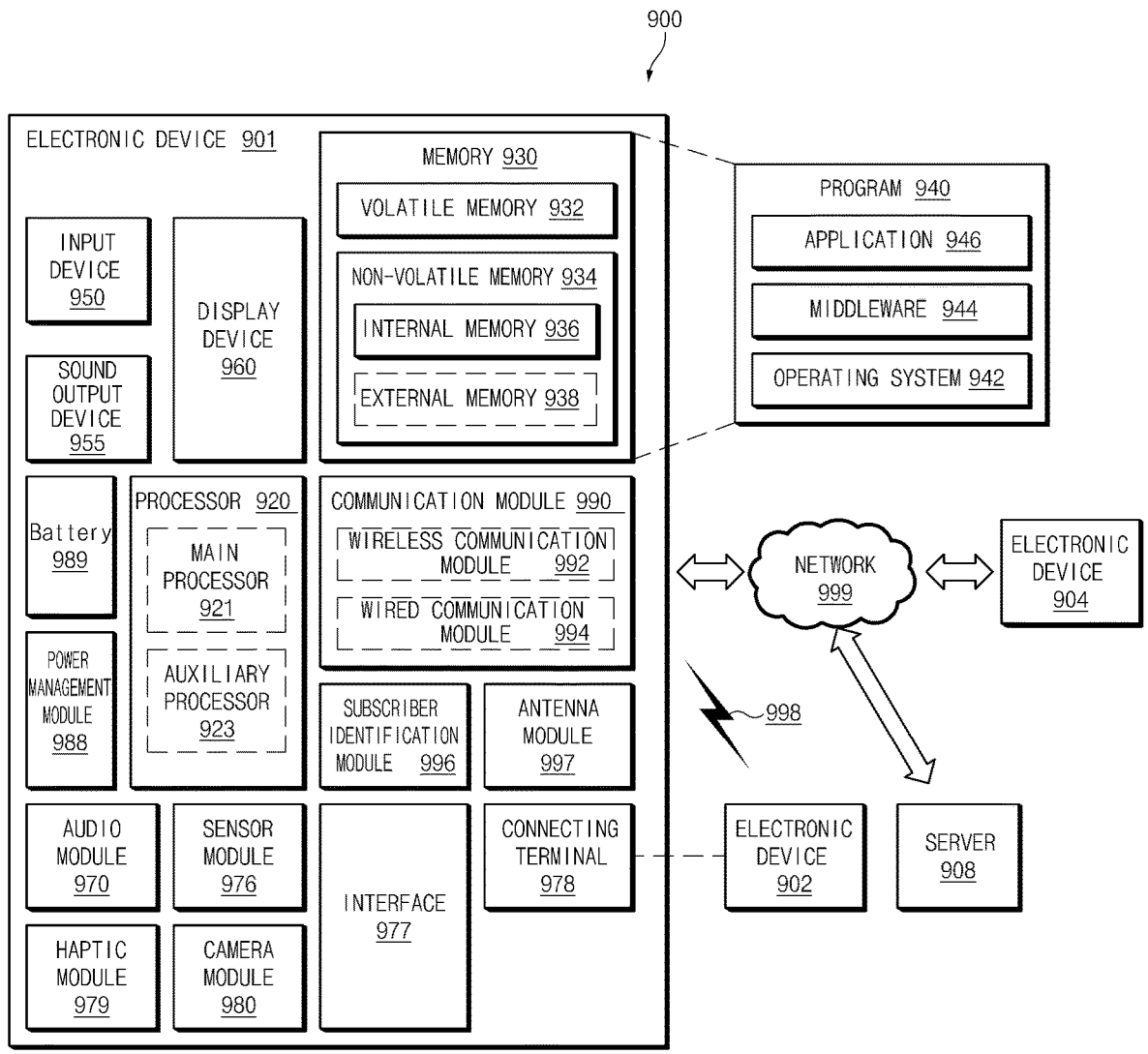
FIG. 9 is a block diagram illustrating an electronic device in a network environment according to various embodiments.

FIG. 9 is a block diagram illustrating an electronic device 901 in a network environment 900 according to various embodiments. Referring to FIG. 9, the electronic device 901 (e.g., the electronic device 100 or the electronic device 300) may communicate with an electronic device 902 through a first network 998 (e.g., a short-range wireless communication) or may communicate with an electronic device 904 and/or a server 908 through a second network 999 (e.g., a long-distance wireless communication) in the network environment 900. According to an embodiment, the electronic device 901 may communicate with the electronic device 904 through the server 908. According to an embodiment, the electronic device 901 may include a processor (e.g., including processing circuitry) 920 (e.g., the processor 380), a memory 930 (e.g., the memory 390), an input device (e.g., including input circuitry) 950, a sound output device (e.g., including sound output circuitry) 955, a display device 960, an audio module (e.g., including audio circuitry) 970, a sensor module 976, an interface (e.g., including interface circuitry) 977, a haptic module (e.g., including haptic circuitry) 979, a camera module 980, a power management module 988, a battery 989, a communication module (e.g., including communication circuitry) 990 (e.g., the wireless communication circuit 105 or the wireless communication circuit 305), a subscriber identification module 996, and an antenna module 997 (e.g., the antennas 152 to 156 or the antennas 352 to 356). According to some embodiments, at least one (e.g., the display device 960 or the camera module 980) among components of the electronic device 901 may be omitted or other components may be added to the electronic device 901. According to some embodiments, some components may be integrated and implemented as in the case of the sensor module 976 (e.g., a fingerprint sensor, an iris sensor, or an illuminance sensor) embedded in the display device 960 (e.g., a display).

The processor 920 may include various processing circuitry and operate, for example, software (e.g., a program 940) to control at least one of other components (e.g., a hardware or software component) of the electronic device 901 connected to the processor 920 and may process and compute a variety of data. The processor 920 may load an instruction or data, which is received from other components (e.g., the sensor module 976 or the communication module 990), into a volatile memory 932, may process the loaded instruction or data, and may store result data into a nonvolatile memory 934. According to an embodiment, the processor 920 may include, for example, and without limitation, a main processor 921 (e.g., a central processing unit, an application processor, or the like) and an auxiliary processor 923 (e.g., a graphic processing device, an image signal processor, a sensor hub processor, a communication processor, or the like), which operates independently from the main processor 921, additionally or alternatively uses less power than the main processor 921, or is specified to a designated function. In this case, the auxiliary processor 923 may operate separately from the main processor 921 or embedded.

In this case, the auxiliary processor 923 may control, for example, at least some of functions or states associated with at least one component (e.g., the display device 960, the sensor module 976, or the communication module 990) among the components of the electronic device 901 instead of the main processor 921 while the main processor 921 is in an inactive (e.g., sleep) state or together with the main processor 921 while the main processor 921 is in an active (e.g., an application execution) state. According to an embodiment, the auxiliary processor 923 (e.g., the image signal processor or the communication processor) may be implemented as a part of another component (e.g., the camera module 980 or the communication module 990) that is functionally related to the auxiliary processor 923. The memory 930 may store a variety of data used by at least one component (e.g., the processor 920 or the sensor module 976) of the electronic device 901, for example, software (e.g., the program 940) and input data or output data with respect to instructions associated with the software. The memory 930 may include the volatile memory 932 or the nonvolatile memory 934.

The program 940 may be stored in the memory 930 as software and may include, for example, an operating system 942, a middleware 944, or an application 946.

The input device 950 may include various input circuitry and be a device for receiving an instruction or data, which is used for a component (e.g., the processor 920) of the electronic device 901, from an outside (e.g., a user) of the electronic device 901 and may include, for example, and without limitation, a microphone, a mouse, and/or a keyboard, or the like.

The sound output device 955 may include various sound output circuitry and be a device for outputting a sound signal to the outside of the electronic device 901 and may include, for example, and without limitation, a speaker used for general purposes, such as multimedia play or recordings play, and/or a receiver used for receiving calls, or the like. According to an embodiment, the receiver and the speaker may be either integrally or separately implemented.

The display device 960 may be a device for visually presenting information to the user and may include, for example, and without limitation, a display, a hologram device, and/or a projector, or the like, and a control circuit for controlling a corresponding device. According to an embodiment, the display device 960 may include a touch circuitry or a pressure sensor for measuring an intensity of pressure on the touch.

The audio module 970 may include various audio circuitry and convert a sound and an electrical signal in dual directions. According to an embodiment, the audio module 970 may obtain the sound through the input device 950 or may output the sound through an external electronic device (e.g., the electronic device 902 (e.g., a speaker or a headphone)) wired or wirelessly connected to the sound output device 955 or the electronic device 901.

The sensor module 976 may generate an electrical signal or a data value corresponding to an operating state (e.g., power or temperature) inside or an environmental state outside the electronic device 901. The sensor module 976 may include, for example, a gesture sensor, a gyro sensor, a pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 977 may include various interface circuitry and support a designated protocol wired or wirelessly connected to the external electronic device (e.g., the electronic device 902). According to an embodiment, the interface 977 may include, for example, and without limitation, an HDMI (high-definition multimedia interface), a USB (universal serial bus) interface, an SD card interface, and/or an audio interface, or the like.

A connection terminal 978 may include a connector that physically connects the electronic device 901 to the external electronic device (e.g., the electronic device 902), for example, and without limitation, an HDMI connector, a USB connector, an SD card connector, and/or an audio connector (e.g., a headphone connector), or the like.

The haptic module 979 may include various haptic circuitry and convert an electrical signal to a mechanical stimulation (e.g., vibration or movement) or an electrical stimulation perceived by the user through tactile or kinesthetic sensations. The haptic module 979 may include, for example, and without limitation, a motor, a piezoelectric device, and/or an electric stimulator, or the like.

The camera module 980 may shoot a still image or a video image. According to an embodiment, the camera module 980 may include, for example, at least one lens, an image sensor, an image signal processor, or a flash.

The power management module 988 may be a module for managing power supplied to the electronic device 901 and may serve as at least a part of a power management integrated circuit (PMIC).

The battery 989 may be a device for supplying power to at least one component of the electronic device 901 and may include, for example, a non-rechargeable (primary) battery, a rechargeable (secondary) battery, or a fuel cell.

The communication module 990 may include various communication circuitry and establish a wired or wireless communication channel between the electronic device 901 and the external electronic device (e.g., the electronic device 902, the electronic device 904, or the server 908) and support communication execution through the established communication channel. The communication module 990 may include at least one communication processor operating independently from the processor 920 (e.g., the application processor) and supporting the wired communication or the wireless communication. According to an embodiment, the communication module 990 may include a wireless communication module 992 (e.g., a cellular communication module, a short-range wireless communication module, or a GNSS (global navigation satellite system) communication module) or a wired communication module 994 (e.g., an LAN (local area network) communication module or a power line communication module) and may communicate with the external electronic device using a corresponding communication module among them through the first network 998 (e.g., the short-range communication network such as a Bluetooth, a WiFi direct, or an IrDA (infrared data association)) or the second network 999 (e.g., the long-distance wireless communication network such as a cellular network, an internet, or a computer network (e.g., LAN or WAN)). The above-mentioned various communication modules 990 may be implemented into one chip or into separate chips, respectively.

According to an embodiment, the wireless communication module 992 may identify and authenticate the electronic device 901 using user information stored in the subscriber identification module 996 in the communication network.

The antenna module 997 may include one or more antennas to transmit or receive the signal or power to or from an external source. According to an embodiment, the communication module 990 (e.g., the wireless communication module 992) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., an instruction or data) with each other.

According to an embodiment, the instruction or data may be transmitted or received between the electronic device 901 and the external electronic device 904 through the server 908 connected to the second network 999. Each of the electronic devices 902 and 904 may be the same or different types as or from the electronic device 901. According to an embodiment, all or some of the operations performed by the electronic device 901 may be performed by another electronic device or a plurality of external electronic devices. When the electronic device 901 performs some functions or services automatically or by request, the electronic device 901 may request the external electronic device to perform at least some of the functions related to the functions or services, in addition to or instead of performing the functions or services by itself. The external electronic device receiving the request may carry out the requested function or the additional function and transmit the result to the electronic device 901. The electronic device 901 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be understood to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may be used to refer to various components regardless of the order and/or the importance, but do not limit the corresponding components. The above expressions are used merely for the purpose of distinguishing an element from the other elements. It should be understood that when an element (e.g., a first element) is referred to as being (operatively or communicatively) "connected," or "coupled," to another element (e.g., a second element), it may be directly connected or coupled directly to the other element or any other element (e.g., a third element) may be interposed between them.

The term "module" used herein may refer, for example, to a unit including one or more combinations of hardware, software and firmware. The term "module" may be interchangeably used with the terms "logic", "logical block", "component" and "circuit". The "module" may be a minimum unit of an integrated component or may be a part thereof. The "module" may be a minimum unit for performing one or more functions or a part thereof. For example, and without limitation, the "module" may include a dedicated processor, a CPU, an application-specific integrated circuit (ASIC), or the like.

Various embodiments of the present disclosure may be implemented by software (e.g., the program 940) including an instruction stored in a machine-readable storage media (e.g., an internal memory 936 or an external memory 938) readable by a machine (e.g., a computer). The machine may be a device that calls the instruction from the machine-readable storage media and operates depending on the called instruction and may include the electronic device (e.g., the electronic device 901). When the instruction is executed by the processor (e.g., the processor 920), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above elements, and a portion of the above sub-components may be omitted, or additional other sub-components may be further included. Alternatively or additionally, some components (e.g., the module or the program) may be integrated in one element and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

What is claimed is:

1. An electronic device comprising:
   at least one processor;
   at least one antenna; and
   a wireless communication circuitry operatively connected to the at least one processor and the at least one antenna,
   wherein the wireless communication circuitry includes:
      a frond end module including a first duplexer, the front end module connected to the at least one antenna;
      a first transmission amplifier; and
      a second duplexer operatively connected to the front end module, wherein the second duplexer includes:
         a switch including a first terminal operatively connected to a path corresponding to a first frequency band, a second terminal operatively connected to a path corresponding to a second frequency band, and a third terminal selectively connected to a corresponding terminal between the first terminal and the second terminal; and a filter circuitry operatively connected between the third terminal and the at least one antenna and having a designated resonant frequency band, wherein the wireless communication circuitry is configured to selectively transmit a signal in one corresponding frequency band of the first frequency band and the second frequency band based on a terminal which is connected to the third terminal, and wherein the first transmission amplifier is configured to output signals to both the first duplexer and the second duplexer, each of the first duplexer and the second duplexer configured to provide signals for transmission to the at least one antenna, and wherein the first duplexer is associated with a fixed frequency band.

2. The electronic device of claim 1, further comprising a tunable circuitry configured to tune the resonant frequency band of the filter circuitry to a corresponding frequency band of the first frequency band and the second frequency band based on the terminal which is connected to the third terminal.

3. The electronic device of claim 2, wherein the tunable circuitry includes at least one capacitor, and the tunable circuitry is configured to tune the resonant frequency band of the filter circuitry using the at least one capacitor.

4. The electronic device of claim 2, wherein the electronic device is configured to support a carrier aggregation using the first frequency band and the second frequency band, and the tunable circuitry is configured to tune the resonant frequency band of the filter circuitry to the first frequency band and the second frequency band.

5. The electronic device of claim 1, wherein the path corresponding to the first frequency band is operatively connected to the first transmission amplifier, and the path corresponding to the second frequency band is operatively connected to a second transmission amplifier.

6. The electronic device of claim 1, wherein the path corresponding to the first frequency band and the path corresponding to the second frequency band are operatively connected to one transmission amplifier which is the first transmission amplifier.

7. The electronic device of claim 1, wherein the switch and the filter circuitry are included in one module.

8. The electronic device of claim 1, wherein the wireless communication circuitry further includes:

another switch including a fourth terminal operatively connected to a path corresponding to a third frequency band, a fifth terminal operatively connected to a path corresponding to a fourth frequency band, and a sixth terminal selectively connected to the fourth terminal or the fifth terminal; and another filter circuitry operatively connected between the sixth terminal and the at least one antenna and having another designated resonant frequency band, wherein the wireless communication circuitry is configured to selectively receive and output from the another switch a signal in a corresponding frequency band of the third frequency band and the fourth frequency band based on a terminal which is connected to the sixth terminal.

9. The electronic device of claim 8, further comprising another tunable circuitry configured to tune the another designated resonant frequency band to a corresponding frequency band of the third frequency band and the fourth frequency band based on the terminal which is connected to the sixth terminal.

10. The electronic device of claim 9, wherein the third frequency band overlaps with at least a portion of the first frequency band, and the fourth frequency band overlaps with at least a portion of the second frequency band.

11. An electronic device comprising:
at least one antenna;
a front end module including a first duplexer, the front end module connected to the at least one antenna;
a first amplifier corresponding to a first frequency band;
a second amplifier corresponding to a second frequency band;
a first tunable duplexer operatively connected to the front end module; and
a processor,
wherein the first tunable duplexer includes:
 a switch including a first terminal operatively connected to the first amplifier, a second terminal operatively connected to the second amplifier, and a third terminal selectively connected to the first terminal or the second terminal;
 a filter circuitry operatively connected between the third terminal and the at least one antenna and having a designated resonant frequency band; and
 a tunable circuitry operatively connected to the filter circuitry and configured to tune the designated resonant frequency band of the filter circuitry to the first frequency band or the second frequency band,
wherein the first amplifier is configured to output signals to both the first tunable duplexer and a non-tunable duplexer of the front end module, each of the first tunable duplexer and the non-tunable duplexer configured to provide signals for transmission to the at least one antenna; and
wherein the processor is configured to:
 operatively connect the first terminal to the third terminal of the switch when a signal is output using the first amplifier;
 operatively connect the second terminal to the third terminal of the switch when the signal is output using the second amplifier; and
 tune the designated resonant frequency band to a corresponding frequency band of the first frequency band and the second frequency band using the tunable circuitry based on a terminal which is connected to the third terminal.

12. The electronic device of claim 11, wherein the filter circuitry and the switch are included in one module.

13. The electronic device of claim 11, wherein the processor includes at least one of a communication processor and/or an application processor.

14. The electronic device of claim 11, further comprising:
a first reception amplifier corresponding to a third frequency band;
a second reception amplifier corresponding to a fourth frequency band;
another switch including a fourth terminal operatively connected to the first reception amplifier, a fifth terminal operatively connected to the second reception amplifier, and a sixth terminal selectively connected to the fourth terminal or the fifth terminal; and
another filter circuitry operatively connected between the sixth terminal and the at least one antenna and having another designated resonant frequency band.

15. The electronic device of claim 14, further comprising another tunable circuitry configured to tune the another designated resonant frequency band to the third frequency band or the fourth frequency band, wherein the processor is configured to:
- operatively connect the fourth terminal to the sixth terminal of the another switch when a signal corresponding to the third frequency band is received;
- operatively connect the fifth terminal to the sixth terminal of the another switch when a signal corresponding to the fourth frequency band is received; and
- control the another tunable circuitry such that the another designated resonant frequency band is tuned to a corresponding frequency band of the third frequency band and the fourth frequency band based on the terminal which is connected to the sixth terminal.

16. The electronic device of claim 15, wherein the third frequency band overlaps with a portion of the first frequency band, and the fourth frequency band overlaps with a portion of the second frequency band.

* * * * *

UNITED STATES PATENT AND TRADEMARK OFFICE
CERTIFICATE OF CORRECTION

PATENT NO. : 10,673,470 B2  
APPLICATION NO. : 16/010815  
DATED : June 2, 2020  
INVENTOR(S) : Lee et al.

Page 1 of 1

It is certified that error appears in the above-identified patent and that said Letters Patent is hereby corrected as shown below:

In the Claims

Claim 1, Line 8 (Column 22, Line 60), replace "frond" with -- front --.

Signed and Sealed this
Twenty-first Day of July, 2020

Andrei Iancu
*Director of the United States Patent and Trademark Office*